US008274925B2

(12) United States Patent
Jacks (10) Patent No.: US 8,274,925 B2
(45) Date of Patent: Sep. 25, 2012

(54) RETAINING TRAFFIC CHANNEL ASSIGNMENTS FOR SATELLITE TERMINALS TO PROVIDE LOWER LATENCY COMMUNICATION SERVICES

(75) Inventor: Eric Claudis Jacks, Sterling, VA (US)

(73) Assignee: ATC Technologies, LLC, Reston, VA (US)

( * ) Notice: Subject to any disclaimer, the term of this patent is extended or adjusted under 35 U.S.C. 154(b) by 494 days.

(21) Appl. No.: 12/652,307

(22) Filed: Jan. 5, 2010

(65) Prior Publication Data

US 2011/0164554 A1   Jul. 7, 2011

(51) Int. Cl.
*H04B 7/185* (2006.01)
*H04B 7/15* (2006.01)
*H04B 1/034* (2006.01)
*H04W 4/00* (2009.01)

(52) U.S. Cl. .......... 370/316; 455/427; 455/11.1; 455/98

(58) Field of Classification Search .......... 370/276–281, 370/315–326, 346–348; 455/427–431, 3.01, 455/450–454, 11.1–13.4, 95–98; 375/211, 375/214–215, 296–297
See application file for complete search history.

(56) References Cited

U.S. PATENT DOCUMENTS

| | | | |
|---|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |

(Continued)

FOREIGN PATENT DOCUMENTS

EP    0 506 255 A2   9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner* — Thai Hoang
(74) *Attorney, Agent, or Firm* — Myers Bigel Sibley & Sajovec, P.A.

(57) ABSTRACT

A traffic channel is assigned for use by a terminal to transmit data traffic to a satellite for relay to a satellite base station. The traffic channel assignment is retained for use by the terminal while the terminal is idle between data traffic transmissions to the satellite in response to a type of service designation that is associated with the terminal.

37 Claims, 4 Drawing Sheets

U.S. PATENT DOCUMENTS

| | | | |
|---|---|---|---|
| 5,842,125 A * | 11/1998 | Modzelesky et al. | 455/426.1 |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,913,164 A * | 6/1999 | Pawa et al. | 455/427 |
| 5,926,745 A * | 7/1999 | Threadgill et al. | 455/12.1 |
| 5,926,758 A | 7/1999 | Grybos et al. | |
| 5,930,295 A * | 7/1999 | Isley et al. | 375/219 |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A | 11/1999 | Mallinckrodt | |
| 6,011,951 A | 1/2000 | King et al. | |
| 6,023,605 A | 2/2000 | Sasaki et al. | |
| 6,035,039 A * | 3/2000 | Tisdale et al. | 380/249 |
| 6,052,560 A | 4/2000 | Karabinis | |
| 6,052,586 A | 4/2000 | Karabinis | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,243,580 B1 * | 6/2001 | Garner | 455/428 |
| 6,253,080 B1 | 6/2001 | Wiedeman et al. | |
| 6,256,497 B1 | 7/2001 | Chambers | |
| 6,278,861 B1 * | 8/2001 | Ward et al. | 455/13.1 |
| 6,324,405 B1 | 11/2001 | Young et al. | |
| 6,339,707 B1 | 1/2002 | Wainfan et al. | |
| 6,408,179 B1 * | 6/2002 | Stosz et al. | 455/428 |
| 6,418,147 B1 | 7/2002 | Wiedeman | |
| 6,449,461 B1 | 9/2002 | Otten | |
| 6,522,865 B1 | 2/2003 | Otten | |
| 6,529,740 B1 * | 3/2003 | Ganucheau et al. | 455/519 |
| 6,628,919 B1 | 9/2003 | Curello et al. | |
| 6,684,057 B2 | 1/2004 | Karabinis | |
| 6,735,437 B2 | 5/2004 | Mayfield et al. | |
| 6,775,251 B1 | 8/2004 | Wiedeman et al. | |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 | 2/2006 | Karabinis et al. | |
| 7,031,702 B2 | 4/2006 | Karabinis et al. | |
| 7,039,400 B2 | 5/2006 | Karabinis et al. | |
| 7,062,267 B2 | 6/2006 | Karabinis | |
| 7,092,708 B2 | 8/2006 | Karabinis | |
| 7,113,743 B2 | 9/2006 | Karabinis | |
| 7,113,778 B2 | 9/2006 | Karabinis | |
| 7,155,340 B2 | 12/2006 | Churan | |
| 7,174,127 B2 | 2/2007 | Otten et al. | |
| 7,181,161 B2 | 2/2007 | Karabinis | |
| 7,203,490 B2 | 4/2007 | Karabinis | |
| 7,218,931 B2 | 5/2007 | Karabinis | |
| 7,295,807 B2 | 11/2007 | Karabinis | |
| 7,340,213 B2 | 3/2008 | Karabinis et al. | |
| 7,418,236 B2 | 8/2008 | Levin et al. | |
| 7,418,263 B2 | 8/2008 | Dutta et al. | |
| 7,421,342 B2 | 9/2008 | Churan | |
| 7,437,123 B2 | 10/2008 | Karabinis et al. | |
| 7,444,170 B2 | 10/2008 | Karabinis | |
| 7,447,501 B2 | 11/2008 | Karabinis | |
| 7,453,396 B2 | 11/2008 | Levin et al. | |
| 7,453,920 B2 | 11/2008 | Churan | |
| 7,454,175 B2 | 11/2008 | Karabinis | |
| 7,457,269 B1 | 11/2008 | Grayson | |
| 7,558,568 B2 | 7/2009 | Karabinis | |
| 7,574,206 B2 | 8/2009 | Karabinis | |
| 7,577,400 B2 | 8/2009 | Karabinis et al. | |
| 7,587,171 B2 | 9/2009 | Evans et al. | |
| 7,593,691 B2 | 9/2009 | Karabinis | |
| 7,593,724 B2 | 9/2009 | Karabinis | |
| 7,593,725 B2 | 9/2009 | Karabinis | |
| 7,593,726 B2 | 9/2009 | Karabinis et al. | |
| 7,596,111 B2 | 9/2009 | Karabinis | |
| 7,599,656 B2 | 10/2009 | Karabinis | |
| 7,603,081 B2 | 10/2009 | Karabinis | |
| 7,603,117 B2 | 10/2009 | Karabinis | |
| 7,606,590 B2 | 10/2009 | Karabinis | |
| 7,609,666 B2 | 10/2009 | Karabinis | |
| 7,620,394 B2 | 11/2009 | Good et al. | |
| 7,623,859 B2 | 11/2009 | Karabinis | |
| 7,623,867 B2 | 11/2009 | Karabinis | |
| 7,627,285 B2 | 12/2009 | Karabinis | |
| 7,634,234 B2 | 12/2009 | Karabinis | |
| 7,636,566 B2 | 12/2009 | Karabinis | |
| 8,170,474 B2 * | 5/2012 | Karabinis et al. | 455/12.1 |
| 2002/0013149 A1 * | 1/2002 | Threadgill et al. | 455/427 |
| 2002/0061759 A1 * | 5/2002 | Maggenti et al. | 455/517 |
| 2002/0122408 A1 | 9/2002 | Mullins | |
| 2002/0133596 A1 | 9/2002 | Border et al. | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0112878 A1 | 6/2003 | Kloper | |
| 2003/0149986 A1 | 8/2003 | Mayfield et al. | |
| 2004/0072539 A1 | 4/2004 | Monte et al. | |
| 2004/0102156 A1 | 5/2004 | Loner | |
| 2004/0121727 A1 | 6/2004 | Karabinis | |
| 2004/0203393 A1 | 10/2004 | Chen | |
| 2004/0240525 A1 | 12/2004 | Karabinis et al. | |
| 2005/0041619 A1 | 2/2005 | Karabinis et al. | |
| 2005/0090256 A1 | 4/2005 | Dutta | |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |
| 2005/0181786 A1 | 8/2005 | Karabinis et al. | |
| 2005/0201449 A1 | 9/2005 | Churan | |
| 2005/0227618 A1 | 10/2005 | Karabinis et al. | |
| 2005/0239399 A1 | 10/2005 | Karabinis | |
| 2005/0260947 A1 | 11/2005 | Karabinis et al. | |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0288011 A1 | 12/2005 | Dutta | |
| 2006/0040613 A1 | 2/2006 | Karabinis et al. | |
| 2006/0094352 A1 | 5/2006 | Karabinis | |
| 2006/0094420 A1 | 5/2006 | Karabinis | |
| 2006/0105707 A1 | 5/2006 | Karabinis | |
| 2006/0111041 A1 | 5/2006 | Karabinis | |
| 2006/0111056 A1 | 5/2006 | Dutta | |
| 2006/0135058 A1 | 6/2006 | Karabinis | |
| 2006/0135070 A1 | 6/2006 | Karabinis | |
| 2006/0165120 A1 | 7/2006 | Karabinis | |
| 2006/0189274 A1 | 8/2006 | Karabinis | |
| 2006/0189275 A1 | 8/2006 | Karabinis | |
| 2006/0194576 A1 | 8/2006 | Karabinis et al. | |
| 2006/0205347 A1 | 9/2006 | Karabinis | |
| 2006/0205367 A1 | 9/2006 | Karabinis | |
| 2006/0211371 A1 | 9/2006 | Karabinis et al. | |
| 2006/0211452 A1 | 9/2006 | Karabinis | |
| 2006/0217070 A1 | 9/2006 | Karabinis | |
| 2006/0229090 A1 * | 10/2006 | LaDue | 455/507 |
| 2006/0246838 A1 | 11/2006 | Karabinis | |
| 2006/0252368 A1 | 11/2006 | Karabinis | |
| 2006/0276129 A1 | 12/2006 | Karabinis | |
| 2006/0276167 A1 * | 12/2006 | Burroughs | 455/404.2 |
| 2006/0292990 A1 | 12/2006 | Karabinis et al. | |
| 2007/0010246 A1 | 1/2007 | Churan | |

| | | |
|---|---|---|
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0037514 A1 | 2/2007 | Karabinis |
| 2007/0072545 A1 | 3/2007 | Karabinis et al. |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0135051 A1 | 6/2007 | Zheng et al. |
| 2007/0184849 A1 | 8/2007 | Zheng |
| 2007/0192805 A1 | 8/2007 | Dutta et al. |
| 2007/0202816 A1 | 8/2007 | Zheng |
| 2007/0232298 A1 | 10/2007 | Karabinis |
| 2007/0238442 A1 | 10/2007 | Mate et al. |
| 2007/0243866 A1 | 10/2007 | Karabinis |
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0032671 A1 | 2/2008 | Karabinis |
| 2008/0032690 A1 | 2/2008 | Karabinis |
| 2008/0113666 A1 | 5/2008 | Monte et al. |
| 2008/0119190 A1 | 5/2008 | Karabinis |
| 2008/0160993 A1 | 7/2008 | Levin et al. |
| 2008/0182572 A1 | 7/2008 | Tseytlin et al. |
| 2008/0214207 A1 | 9/2008 | Karabinis |
| 2008/0268836 A1 | 10/2008 | Karabinis et al. |
| 2009/0011704 A1 | 1/2009 | Karabinis |
| 2009/0029696 A1 | 1/2009 | Karabinis |
| 2009/0040100 A1 | 2/2009 | Levin et al. |
| 2009/0042509 A1 | 2/2009 | Karabinis et al. |
| 2009/0042516 A1 | 2/2009 | Karabinis |
| 2009/0075645 A1 | 3/2009 | Karabinis |
| 2009/0088151 A1 | 4/2009 | Karabinis |
| 2009/0104903 A1 | 4/2009 | Karabinis |
| 2009/0131046 A1 | 5/2009 | Karabinis et al. |
| 2009/0137203 A1 | 5/2009 | Karabinis et al. |
| 2009/0156154 A1 | 6/2009 | Karabinis et al. |
| 2009/0170427 A1 | 7/2009 | Karabinis |
| 2009/0170428 A1 | 7/2009 | Karabinis |
| 2009/0170429 A1 | 7/2009 | Karabinis |
| 2009/0186622 A1 | 7/2009 | Karabinis |
| 2009/0231187 A1 | 9/2009 | Churan |
| 2009/0285150 A1 | 11/2009 | Ravishankar et al. |
| 2009/0296628 A1 | 12/2009 | Karabinis |
| 2009/0305697 A1 | 12/2009 | Karabinis et al. |
| 2009/0312013 A1 | 12/2009 | Karabinis |
| 2010/0041418 A1 * | 2/2010 | Edge et al. .............. 455/456.2 |
| 2010/0214996 A1 * | 8/2010 | Santhanam et al. ......... 370/329 |
| 2011/0164554 A1 * | 7/2011 | Jacks .......................... 370/320 |

FOREIGN PATENT DOCUMENTS

| | | |
|---|---|---|
| EP | 0 506 255 A3 | 9/1992 |
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 944 885 A2 | 7/2008 |
| EP | 1 569 363 B1 | 11/2008 |
| WO | WO 01/54314 A1 | 7/2001 |

OTHER PUBLICATIONS

Ayyagari et al., "A satellite-augmented cellular network concept", *Wireless Networks*, Vo. 4, 1998, pp. 189-198.

International Search Report and Written Opinion of the International Searching Authority corresponding to International Application No. PCT/US2010/061247; Date of Mailing: Apr. 1, 2011; 12 pages.

International Preliminary Report on Patentability, PCT Application No. PCT/US2010/061247, Nov. 29, 2011.

* cited by examiner

RETAINING TRAFFIC CHANNEL ASSIGNMENTS FOR SATELLITE TERMINALS TO PROVIDE LOWER LATENCY COMMUNICATION SERVICES

FIELD OF THE INVENTION

This invention relates to wireless communications systems and methods and more particularly to satellite and terrestrial wireless communications systems and methods.

BACKGROUND OF THE INVENTION

A satellite radioterminal communications system may use a single satellite antenna pattern (beam or cell) that provides a single communications service region for satellite radioterminals that are served by the system. Alternatively or in combination with the above, in cellular satellite radioterminal communications systems, multiple satellite antenna patterns (beams or cells) are provided, each of which can serve a substantially distinct service region in an overall service region, to collectively provide service to the overall communication service region. Thus, a cellular architecture that is similar to that used in conventional terrestrial cellular radioterminal systems can be implemented in cellular satellite-based systems and methods. The satellite typically communicates with radioterminals over a bidirectional communications pathway, with radioterminal communications signals being communicated from the satellite to the radioterminal over a downlink or forward link (also referred to as forward service link), and from the radioterminal to the satellite over an uplink or return link (also referred to as return service link). In some cases, such as, for example, in broadcasting, the satellite may communicate information to one or more radioterminals unidirectionally. The overall design and operation of cellular satellite radioterminal systems and methods are well known to those having skill in the art, and need not be described further herein.

Terrestrial networks can enhance cellular satellite radioterminal system availability, efficiency and/or economic viability by terrestrially reusing at least some of the frequency bands that are allocated to cellular satellite radioterminal systems. In particular, it is known that it may be difficult for cellular satellite radioterminal systems to reliably serve densely populated areas, because the satellite signal may be blocked by high-rise structures and/or may not penetrate into buildings. As a result, the satellite spectrum may be underutilized or unutilized in such areas. The terrestrial reuse of at least some of the satellite system frequencies can reduce or eliminate this potential problem.

Moreover, the capacity of a hybrid system, comprising terrestrial and satellite-based connectivity and configured to terrestrially reuse at least some of the satellite-band frequencies, may be higher than a corresponding satellite-only system since terrestrial frequency reuse may be much denser than that of the satellite-only system. In fact, capacity may be enhanced where it may be mostly needed, i.e., in densely populated urban/industrial/commercial areas where the connectivity/signal(s) of a satellite-only system may be unreliable. As a result, a hybrid (satellite/terrestrial cellular) system that is configured to reuse terrestrially at least some of the frequencies of the satellite band may become more economically viable, as it may be able to serve more effectively and reliably a larger subscriber base.

One example of terrestrial reuse of satellite frequencies is described in U.S. Pat. No. 5,937,332 to Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing an effective downlink/uplink margin in the vicinity of the satellite telecommunications repeater and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radioterminal communications systems and methods that may employ terrestrial use and/or reuse of satellite frequencies by an Ancillary Terrestrial Network (ATN) comprising at least one Ancillary Terrestrial Component (ATC) are also described in U.S. Pat. Nos. 6,684,057 to Karabinis, entitled Systems and Methods for Terrestrial Reuse of Cellular Satellite Frequency Spectrum; 6,785,543 to Karabinis, entitled Filters for Combined Radiotelephone/GPS Terminals; 6,856,787 to Karabinis, entitled Wireless Communications Systems and Methods Using Satellite-Linked Remote Terminal Interface Subsystems; 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; and 6,879,829 to Dutta et al., entitled Systems and Methods for Handover Between Space Based and Terrestrial Radioterminal Communications, and For Monitoring Terrestrially Reused Satellite Frequencies At a Radioterminal to Reduce Potential Interference, and in U.S. Pat. Nos. 6,892,068, 6,937,857, 6,999,720 and 7,006,789; and Published U.S. Patent Application Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2002/0041575 to Karabinis et al., entitled Coordinated Satellite-Terrestrial Frequency Reuse; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, and in Published U.S. Patent Application Nos. 2004/0121727, 2004/0142660, 2004/0192395, 2004/0192200, 2004/0192293, 2004/0203742, 2004/0240525, 2005/0026606, 2005/0037749, 2005/0041619, 2005/0064813, 2005/0079816, 2005/0090256, 2005/0118948, 2005/0136836, 2005/0164700, 2005/0164701, 2005/0170834, 2005/0181786, 2005/0201449, 2005/0208890, 2005/0221757, 2005/0227618, 2005/0239457, 2005/0239403, 2005/0239404, 2005/0239399, 2005/0245192, 2005/0260984, 2005/0260947, 2005/0265273, 2005/00272369, 2005/0282542, 2005/0288011, 2006/0040613, 2006/040657 and 2006/0040659; all of which are assigned to the assignee of the present invention, the disclosures of all of which are hereby incorporated herein by reference in their entirety as if set forth fully herein. Various techniques for coordination of operations of satellite and terrestrial components are described in U.S. Patent Application Publication No. 2005/0090256 to Dutta, entitled Systems and Methods for Mobility Management in Overlaid Mobile Communications Systems, and U.S. patent application Ser. No. 11/548,825 to Tronc et al. entitled Systems, Methods and Computer Program Products for Mobility Management in Hybrid Satellite/Terrestrial Wireless Communications Systems, filed Oct. 12, 2006, both of which are assigned to the assignee of the present invention, the disclosures of both of which are hereby incorporated herein by reference in their entirety as if set forth fully herein.

SUMMARY OF THE INVENTION

Some embodiments of the present invention provide wireless communications methods. Communications between a terminal and a satellite base station are established through a satellite. A traffic channel is assigned for use by the terminal to transmit data traffic to the satellite for relay to the satellite base station. The traffic channel assignment is retained for use by the terminal while the terminal is idle between data traffic transmissions to the satellite in response to a Type of Service (ToS) designation that is associated with, the terminal.

Because the traffic channel can be pre-assigned to the terminal before it has data traffic that is ready for transmission and the traffic channel can be retained for use by the terminal while the terminal is idle, the terminal may more quickly transition from being idle to transmitting data traffic. The pre-assignment and retention of traffic channels to terminals may be regulated in response to a TOS designation that is associated with the terminals. The TOS designation may, for example, identify which terminals are to be provided reduced latency communication for PTT protocol service, VOIP service, and/or another service. The TOS designations for individual terminals may be controlled by service providers as a way of offering a premium service to subscribers. The number of traffic channels within a spot beam that are pre-assigned and retained for use by registered terminals can be controlled so that a defined number of other traffic channels are available for assignment to terminals responsive to traffic channel requests therefrom.

Some other embodiments of the present invention provide a wireless communication system that includes a satellite base station. The satellite base station is configured to assign a traffic channel for use by a terminal to transmit data traffic to a satellite for relay to the satellite base station, and to retain the traffic channel assignment for use by the terminal while the terminal is idle between data traffic transmissions to the satellite in response to a type of service designation that is associated with the terminal.

Some other embodiments of the present invention provide a wireless communication system that includes a terminal that is configured to receive from a satellite base station a traffic channel assignment for use by the terminal to transmit data traffic to a satellite for relay to the satellite base station and a command that indicates whether traffic channel assignment is to be retained while idle. The terminal is further configured to retain the traffic channel assignment for use by the terminal while the terminal is idle between data traffic transmissions to the satellite in response to the command indicating that the assignment is to be retained while idle.

BRIEF DESCRIPTION OF THE DRAWINGS

The accompanying drawings, which are included to provide a further understanding of the invention and are incorporated in and constitute a part of this application, illustrate certain embodiments of the invention.

DETAILED DESCRIPTION

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

In some alternate implementations, the operations/methods identified in the message flow diagrams may occur out of the identified order. For example, two operations/methods shown in succession may in fact be carried out substantially concurrently or the operations/methods may sometimes be carried out in the reverse order, depending upon the operations/methods involved. Moreover, the functionality of a particular illustrated operation/method may be separated into multiple discrete operations/methods and/or the functionality of two or more discrete operations/methods may be at least partially integrated. Although some of the diagrams include arrows on communication paths to show what may be a primary direction of communication, it is to be understood that communication may occur in the opposite direction to the depicted arrows.

As used herein, the term "radioterminal" includes any type of user device/equipment that can communicate through radio frequency signaling with a space-based communications network (SBN). A radioterminal may be further configured to terrestrially use/reuse at least some of the frequency bands that are allocated to the SBN for communication with an ancillary terrestrial communications network (ATN), and such a radioterminal can be referred to as an "ancillary terminal (AT)". A radioterminal may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A "radioterminal" also may be referred to herein as a "terminal," "wireless terminal," "subscriber station," "radiotelephone," or "wireless user device".

Furthermore, as used herein, the term "SBN" includes one or more satellites at any orbit (geostationary, substantially geostationary, medium earth orbit, low earth orbit, etc.) and may further include terrestrial components, such as a satellite base station, a serving gateway, and/or network infrastructure. The term "ATN" may include one or more "ancillary terrestrial components (ATCs)", which may each include a plurality of geographically distributed base stations (e.g., in cellular arrangements), which may be ground installations, vehicle-borne installations, airborne installations and/or ship-borne installations. Some embodiments of the present invention are described in the context of an SBN that is overlaid on an ATN, although the invention is not limited thereto as it may be embodied in any type of SBN.

Figure 1:
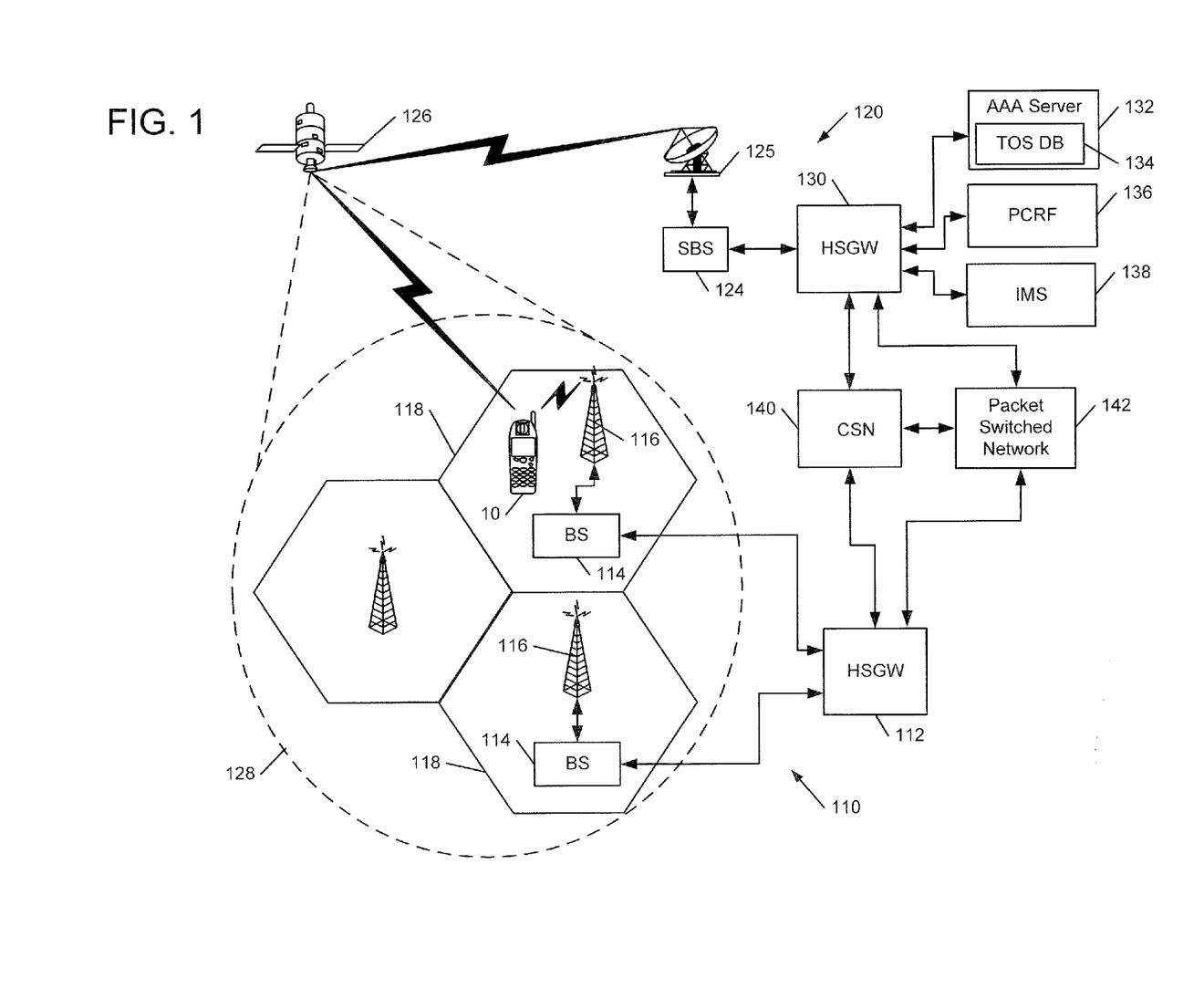
FIG. 1 is a schematic diagram of a wireless communication system and associated methods according to some embodiments of the present invention.

Various embodiments of the present invention are directed to reducing communication latency for terminals that communicate with a SBN. FIG. 1 is a diagram that illustrates a wireless communications system that provides overlaid operation of a SBN 120 and an ATN 110 according to some embodiments of the present invention. At least a portion of spectrum that is allocated to the SBN 120 may be used/reused by the ATCs of the ATN 110 in various locations of a service area, such as in urban/suburban areas of the continental United States (CONUS). Satellite spot beams of the SBN 120 are overlaid on this service area, such that coverage zones of the ATCs and the SBN 120 at least partially overlap.

Referring to the exemplary embodiment of FIG. 1, the SBN 120 can include one or more satellites 126 which relay communications between one or more satellite base stations (SBS) 124 and terminals 10 that are located within one or more spot beams 128 of the satellite(s) 126. The SBS 124 transmits and receives radio frequency signals through an associated antenna(s) 125 to communicatively interconnect the terminals 10 to ground-based network infrastructure. Exemplary components of such ground-based network infrastructure may include, but are not limited to, a High Rate Packet Data (HRPD) Serving Gateway (HSGW) 130, an Authorization Authentication Accounting (AAA) server 132, Policy and Charging Rules Function (PCRF) equipment 136, and an IP Multimedia Subsystem (IMS) 138. The HSGW 132 may be directly connected to a packet switched network 142 (e.g. private/public wide area network) and/or may be connected to the packet switched network 142 through a Connectivity Services Network (CSN) 140.

The ATN 110 can include one or more base stations (BS) 114 that communicate through associated antennas 116 with the terminals 10 that are located within their respective coverage areas 118. Each BS 114 communicatively connects serviced terminals 10 to ground-based network infrastructure, such as a HSGW 112.

Because communications between a terminal 10 and a BS 114 occur over relatively short distances (e.g., typically less than 50 miles), there is a relatively small communication latency therebetween. In contrast, communications between a terminal 10 and the SBS 124 are relayed through the orbiting satellite 126 and, therefore, occur over significant distances. Consequently, a single round-trip communication between a terminal 10 and the SBS 124 may add up to 700 ms or more latency to any request and response communication sequence therebetween. Such communication latency may be particularly undesirable when carrying out some communication protocols, such as for Push-To-Talk (PTT) voice data communications and Voice Over Internet Protocol (VOIP) communications.

In accordance with some embodiments, when a terminal 10 registers with the network infrastructure, the SBS 124 proceeds with pre-assigning a traffic channel to the terminal 10 without waiting for the terminal 10 to necessarily have data traffic that is ready to be transmitted. The assigned traffic channel is to be used by the terminal 10 to transmit data traffic, if and when data traffic is ready for transmission, through the satellite 126 to the SBS 124. The SBS 124 transmits to the terminal 10 the traffic channel assign and a command that indicates whether the traffic channel assignment is to be retained while idle. The SBS 124 then retains the assigned traffic channel for use by the terminal 10 while the terminal 10 is idle between data traffic transmissions to the SBS 124. The terminal 10 retain the traffic channel assignment for use by the terminal while the terminal is idle between data traffic transmissions to the satellite 126 in response to the command indicating that the assignment is to be retained while idle. The terminal 10 may thereby more quickly transmit data traffic as it is becomes ready by using the assigned traffic channel without incurring a potentially significant transmission delay that may occur if the terminal 10 were required to transmit a traffic channel request (e.g., a Connection Request Message) through the satellite 126 to the SBS 124 and then wait for a responsive traffic channel assignment.

If not constrained, such retention of traffic channels could result in all traffic channels being assigned to idle terminals and with no remaining traffic channels being available for use by other terminals that are ready to transmit data traffic. However, in accordance with some embodiments, the pre-assignment and retention of traffic channels is regulated in response to a Type Of Service (TOS) designation that is associated with terminals. The TOS designation may indicate that a particular terminal is to be provided reduced latency PTT protocol service, reduced latency VOIP service, and/or another reduced latency communication service. The SBN 120 may be configured to respond to a first TOS designation being associated with a terminal by retaining a traffic channel for exclusive use by the terminal while the terminal is idle between data traffic transmissions to the satellite 126 and, in contrast, may respond to a different second TOS designation being associated with the terminal by not assigning a traffic channel for use by the terminal until a traffic channel request is received therefrom and then releasing the assigned traffic channel for use by another terminal in response to the terminal becoming idle between data traffic transmission.

A terminal having the first TOS designation, which has received a command that indicates whether the traffic channel assignment is to be retained while idle, may thereby transmit data traffic through the retained traffic channel assignment without waiting for the system to assign another traffic channel to the terminal. In contrast, a terminal having the second TOS designation, which has not received a pre-assigned traffic channel and/or has not received a command indicating that the traffic channel assignment is to be retained while idle, must transmit a traffic channel request (e.g., transmit a Connection Request Message) to the system and wait for a traffic channel assignment thereto before transmitting data traffic. The first TOS designated terminal may thereby more quickly transition from being idle to transmitting data to the SBS 124 compared to the second TOS designated terminal, and which may be particularly advantageous for PTT protocol service, VOIP service, and/or another communication service that has alternating cycles of the terminal being ready to transmit data traffic and then being idle.

The SBN 120 may control how many terminals within the spot beam 128 have the first TOS designation and/or may change dynamically change the TOS designations associated with particular terminals in order control how many traffic channels are available for assignment to terminals. A SBN operator may thereby offer reduced latency communication services as a premium service for subscribers and/or as an otherwise marketable feature of its system.

For example, when the satellite 126 is able to simultaneously receive signals through 96 active traffic channels within the spot beam 128, the SBN 120 may reserve 16 traffic channels for communications relating to registration of terminals and other access related functionality. Of the 80 remaining traffic channels, the SBN 120 may reserve a portion (e.g., 40 traffic channels) for pre-assignment and retention by terminals so as to provide reduced latency communication services thereto, and may leave the remaining portion (e.g., another 40 traffic channels) available for assignment to other terminals in response to specific traffic channel requests (e.g., Connection Request Messages) from the other terminals. The number of traffic channels that are assigned as reduced latency traffic channels and otherwise available as regular latency traffic channels can be regulated by the SBN 120 responsive to the TOS designation for the terminals and/or other operational characteristics, such as those explained below.

When the number of traffic channels that are available for assignment to second TOS designated terminals falls below a threshold value, the SBN 120 may reduce the number of traffic channels that are available to be pre-assigned and retained by first TOS designated terminals. The SBN 120 may alternatively or additionally release presently assigned traffic channels for use by other terminals by notifying certain idle first TOS designated terminals that they no longer retain a traffic channel and must therefore transmit a traffic channel request and wait for a responsive traffic channel assignment before their next data traffic transmission. For example, the SBN 120 may transmit a command to the certain idle first TOS designated terminals that notifies them that they may no longer retain the previously assigned traffic channels.

In some embodiments, the SBS 124 may release a traffic channel that is presently assigned to first TOS designated terminal for use by another terminal in response to determining that a signal quality of a communication that is received by the satellite 126 from the terminal and/or that is received by the terminal from the satellite 126 is less than a threshold level. Accordingly, bad signal quality, such as due to a terminal entering a building, may trigger cessation of reduced latency communication service for that terminal. The threshold level may be a static value or a value that is controlled responsive to one or more defined parameters, such as a number of actively communicating terminals and/or a number of idle terminals that are registered in the spot beam 128.

In some embodiments, the SBS 124 may release a traffic channel that is presently assigned to first TOS designated terminal for use by another terminal in response to determining that the terminal is moving at greater than a threshold velocity. Because terminal velocity can affect communication signal quality (e.g., higher velocity can result in lower signal quality), the SBS 124 may cease providing reduced latency communication service when the terminal's velocity exceeds the threshold. The threshold velocity may be a static value or a value that is controlled responsive to one or more defined parameters, such as a number of actively communicating terminals and/or a number of idle terminals that are registered in the spot beam 128.

In some embodiments, the SBS 124 may switch from retaining a traffic channel assignment for an idle terminal to releasing the traffic channel assignment upon the terminal becoming idle and, vice versa, to track dynamic changes to a priority level that is assigned to the terminal. The high priority assigned to a terminal may be controllable by a user, such as by activation of an emergency communication mode, and/or it may be controlled by the SBS 124 responsive to an operational mode of the terminal (e.g., PTT mode and/or VOIP mode).

The SBS 124 may alternatively or additionally switch from retaining a traffic channel assignment for an idle terminal to releasing the traffic channel assignment upon the terminal becoming idle and, vice versa, in response to determining that the terminal is located at a defined geographic location, such as within a region that does not have overlapping coverage by the ATN 110 and/or at a defined location such as at a work facility.

The SBS 124 may alternatively or additionally switch from retaining a traffic channel assignment for an idle terminal to releasing the traffic channel assignment upon the terminal becoming idle and, vice versa, in response to occurrence of a time of day and/or a day of week. Accordingly, the SBS 124 may cease retaining a traffic channel assignment for an idle terminal during weekdays and/or within historically higher traffic times of the day.

With further reference to FIG. 1, The AAA server 132 can be configured to respond to a registration request from the terminal 10 by authenticating the terminal 10, determine that the terminal 10 is authorized to receive communication services from the SBN 120, and by providing accounting management for services used by the terminal 10. In accordance with some embodiments, the AAA server 132 can be further configured to response to the registration request by accessing a database 134, which associates terminal identifiers (e.g., the Electronic Serial Number (ESN) of terminals) with TOS designations, to identify the TOS designation for the terminal 10 seeking registration. The registration request may therefore serve as a database query that triggers the AAA server 132 to query the database 134 and to communicate the identified TOS designation to the SBS 124 for use in determining whether a traffic channel is to be pre-assign and retained by the terminal 10.

The PCRF equipment 136 and the IMS 138 may operate in a convention manner defined by, for example, the 3GPP standards, and/or other communication standards that are well known in the art. Alternatively, one or both of those components may be configured to assist in defining the TOS designations and/or otherwise controlling how many traffic channels within the spot beam 128 are available for pre-assignment and retention by terminals to provide reduced latency communication services.

Figure 2:
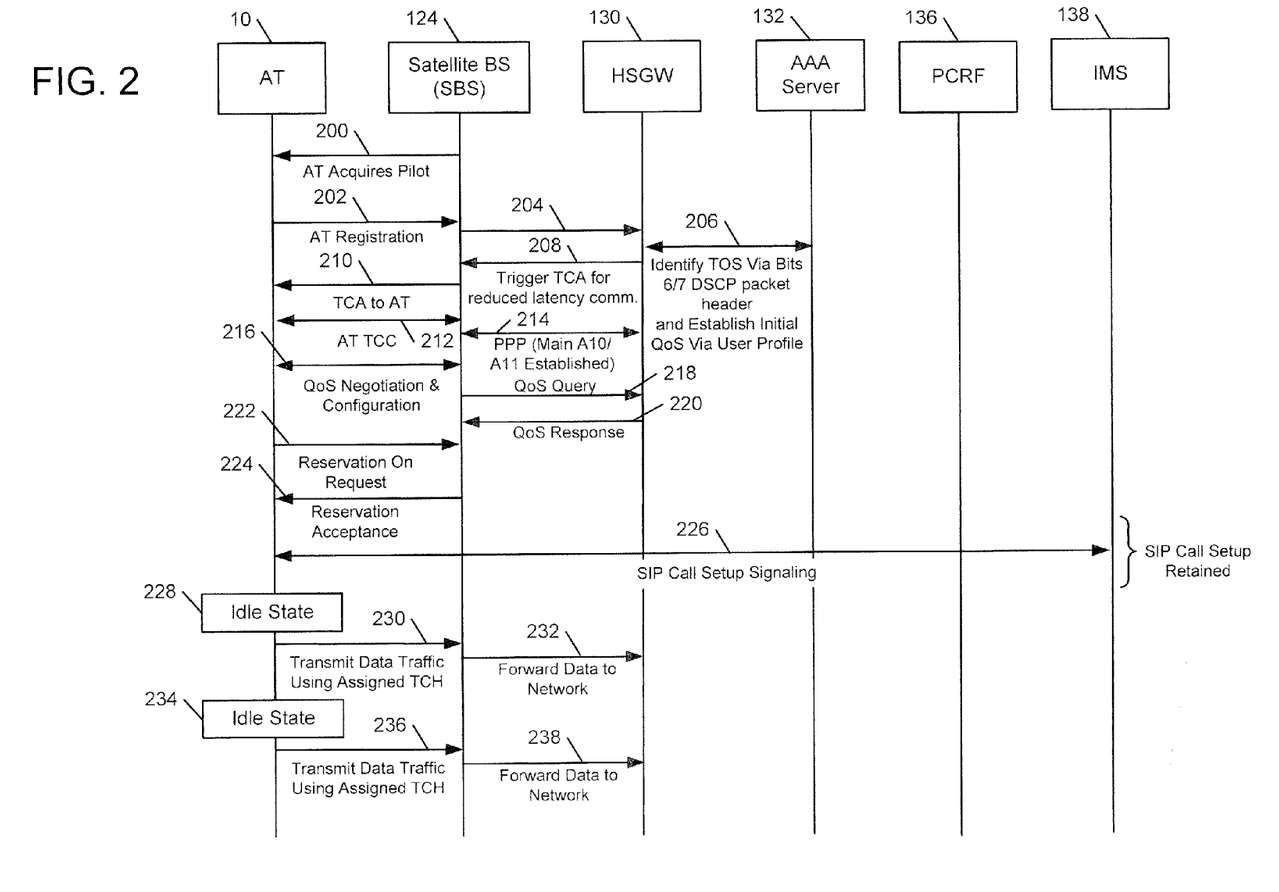
FIG. 2 is a message flow diagram that illustrates exemplary operations and methods of the system of FIG. 1 that assign, retain, and release traffic channels for terminals in accordance with some further embodiments of the present invention.

FIG. 2 is a message flow diagram that illustrates exemplary operations and methods of the system of FIG. 1 that assign, retain, and release a traffic channel for the terminal 10, which may be an Ancillary Terminal (AT) configured to communication through both the SBN 120 and the ATN 110, in accordance with some further embodiments of the present invention. Referring to FIG. 2, the AT 10 acquires (block 200) a pilot channel which it monitors for commands from the SBS 124, such as identification of a command channel which it will transmit a registration request to the satellite 126 and, therethrough, to the base station 124. The AT 10 transmits a registration request (block 202) to the SBS 124, which is communicated through the HSGW 130 (block 204) to the AAA server 132 (block 206). The AAA server 132 authenticates the identified terminal and determines whether the identified terminal is authorized to communicate through the SBN 120. If so, the AAA server 132 searches the database 134 responsive to the registration request to identify the TOS designation for the identified terminal, and communicates a data packet identifying the TOS designation to the HSGW 130.

The AAA server 132 may communicate the identified TOS designation in a Differentiated Services Code Point (DSCP) header portion of the data packet which is communicated to the HSGW 130 responsive to the registration request from the AT 10. More particularly, the TOS designation for the AT 10 may be defined by a logic value contained in bit locations 6 and/or 7 of the DSCP header portion of the data packet. The HSGW 130 may thereby determine the TOS designation of the AT 10 by determining the logical value at bit locations 6 and/or 7 of the DSCP header portion of the data packet that is received from the AAA server 132.

The HSGW 130 responds to the TOS designation corresponding to a reduced latency communication service by communicating (block 208) a message to the SBS 124 to carry out Traffic Channel Assignment (TCA). The SBS 124 assigns a traffic channel to the AT 10 and communicates (block 210) a message to the AT 10 that identifies the assigned traffic channel and notifies the AT 10 that the traffic channel will be retained for use by the AT 10 while the AT 10 is idle between data traffic transmissions. In some embodiments, the SBS 124 assigns a carrier frequency of a Frequency Division Multiplex Access (FDMA) channel for use by the AT 10 to transmit data traffic to the satellite 126 for relay to the SBS 124. The assigned carrier frequency is then retained for exclusive use by the AT 10 while the AT 10 is idle between data traffic transmissions to the satellite 126.

In some other embodiments, the SBS 124 assigns a timeslot of a Time Division Multiplex Access (TDMA) channel for use by the AT 10 to transmit data traffic to the satellite 126 for relay to the SBS 124. The assigned timeslot is then retained for exclusive use by the AT 10 while the AT 10 is idle between data traffic transmissions to the satellite 126.

In some other embodiments, the SBS 124 assigns a spreading code of a Code Division Multiplex Access (CDMA) channel for use by the AT 10 to transmit data traffic to the satellite 126 for relay to the SBS 124. The assigned spreading code is then retained for exclusive use by the AT 10 while the AT 10 is idle between data traffic transmissions to the satellite 126.

The AT 10 and the SBS 124 communicate (block 212) to confirm receipt of the TCA and to set up a connection through the SBS 124 and the HSGW 130. For example, a Point-to-Point Protocol (PPP) link layer can be set up (block 214) for the AT 10 through the ground-based network infrastructure (e.g., a core network) as a A10/A11 connection a conventional manner according to one or more of the 3GPP standards, which is well known in the art.

The AT 10 and the SBS 124 may further negotiate and configure (block 216) a Quality of Service (QoS) level for PTT, VOIP, and/or other communications to/from the AT 10. The negotiation and configuration may include QoS queries and responses (blocks 218 to 220) between the SBS 124 and the HSGW 130, and may further include communication with the AAA server 142. The AT 10 may transmit a Reservation on Request message (block 222) that requests access to certain network resources, and the SBS 124 can respond thereto using a Reservation Acceptance message (block 224). A session initiation protocol (SIP) can then be established (block 226) through the ground-based network infrastructure for use in communications by the terminal.

The AT 10 can then enter an idle state 228 if it is does not presently have data traffic that is ready for transmission. In response to ready data traffic, the AT 10 exits the idle state 228 and uses the assigned traffic channel to transmit (block 230) the data traffic to the satellite 126 for relay to the SBS 124. The SBS 124 forwards (block 230) the data traffic through the HSGW 130 to the packet switched network 142. The AT 10 can then return (block 232) to the idle state. In response to subsequently ready data traffic, the AT 10 uses the assigned traffic channel (TCH) to transmit (block 234) the data traffic to the satellite 126 for relay to the SBS 124, and the data traffic is forwarded (block 236) through the HSGW 130 to the packet switched network 142.

The AT 10 is thereby provided reduced latency communication service because of its ability to more immediately transmit data traffic as it becomes ready for transmission, and without be required to transmit a traffic channel request to the SBS 124 and wait for a responsive traffic channel assignment. Reducing communication latency may be particularly desirable for some communication protocol services, such as for PTT voice data communications and VOIP communications where data traffic may be generated responsive to a user's action (e.g., pressing a PTT switch and/or speaking into a microphone).

Figure 3:
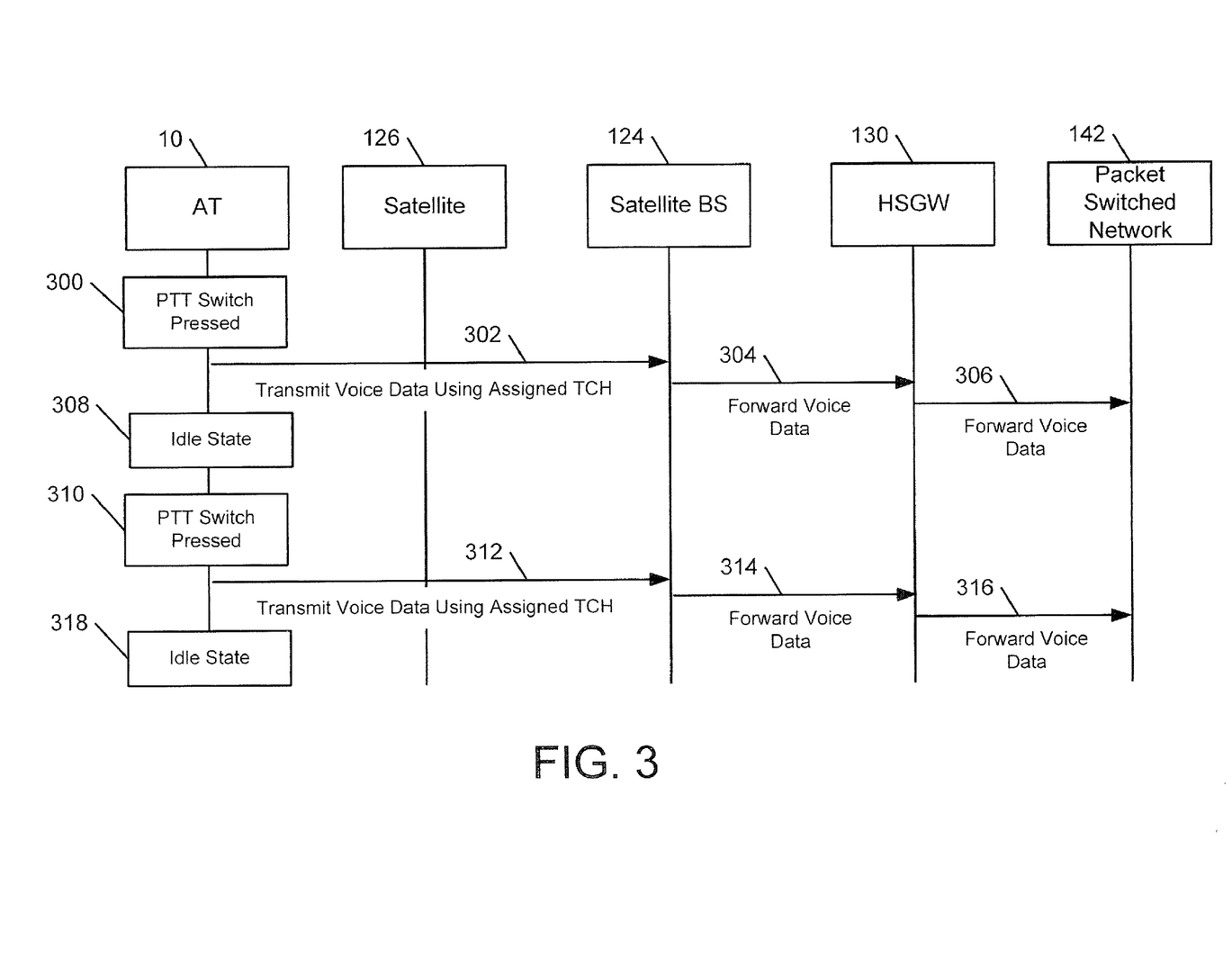
FIG. 3 is a message flow diagram that illustrates exemplary operations and methods for Push-To-Talk voice data communication by the terminal of FIG. 2 in accordance with some further embodiments of the present invention.

FIG. 3 is a message flow diagram that illustrates exemplary operations and methods for PTT voice data communication by the AT 10 of FIG. 2 in accordance with some further embodiments of the present invention. Referring to FIG. 3, each of a sequence of user activations of a PTT switch of the AT 10 triggers transmission of voice data traffic (e.g., generated from voice that is sensed by a microphone in the AT 10) from the AT 10 through the retained traffic channel assignment without waiting for assignment of another traffic channel to the AT 10.

More particularly, responsive to a user pressing the PTT switch (block 300), the AT 10 transmits (302) voice data to the satellite 126, for relay to the SBS 124, using the assigned traffic channel and without waiting for assignment of another traffic channel to the AT 10. The SBS 124 forwards (block 304) the voice data to the HSGW 130, which forwards (block 306) the voice data to the packet switched network 142. The AT 10 then returns to the idle state 308 in response to not having further data traffic that is ready for transmission. While in the idle state, the SBS 124 retains the assigned traffic channel for exclusive use by the AT 10 (i.e., the assigned traffic channel is not reassigned for use by another AT). Again responsive to the user pressing the PTT switch (block 310), the AT 10 transmits (block 312) the voice data to the satellite 126, for relay to the SBS 124, using the assigned traffic channel and without waiting for assignment of another traffic channel to the AT 10 can. The SBS 124 forwards (block 314) the voice data to the HSGW 130, which forwards (block 316) the voice data to the packet switched network 142. The AT 10 then returns (block 318) to the idle state in response to not having further data traffic that is ready for transmission. While in the idle state, the SBS 124 again retains the assigned TCH for exclusive use by the AT 10.

Figure 4:
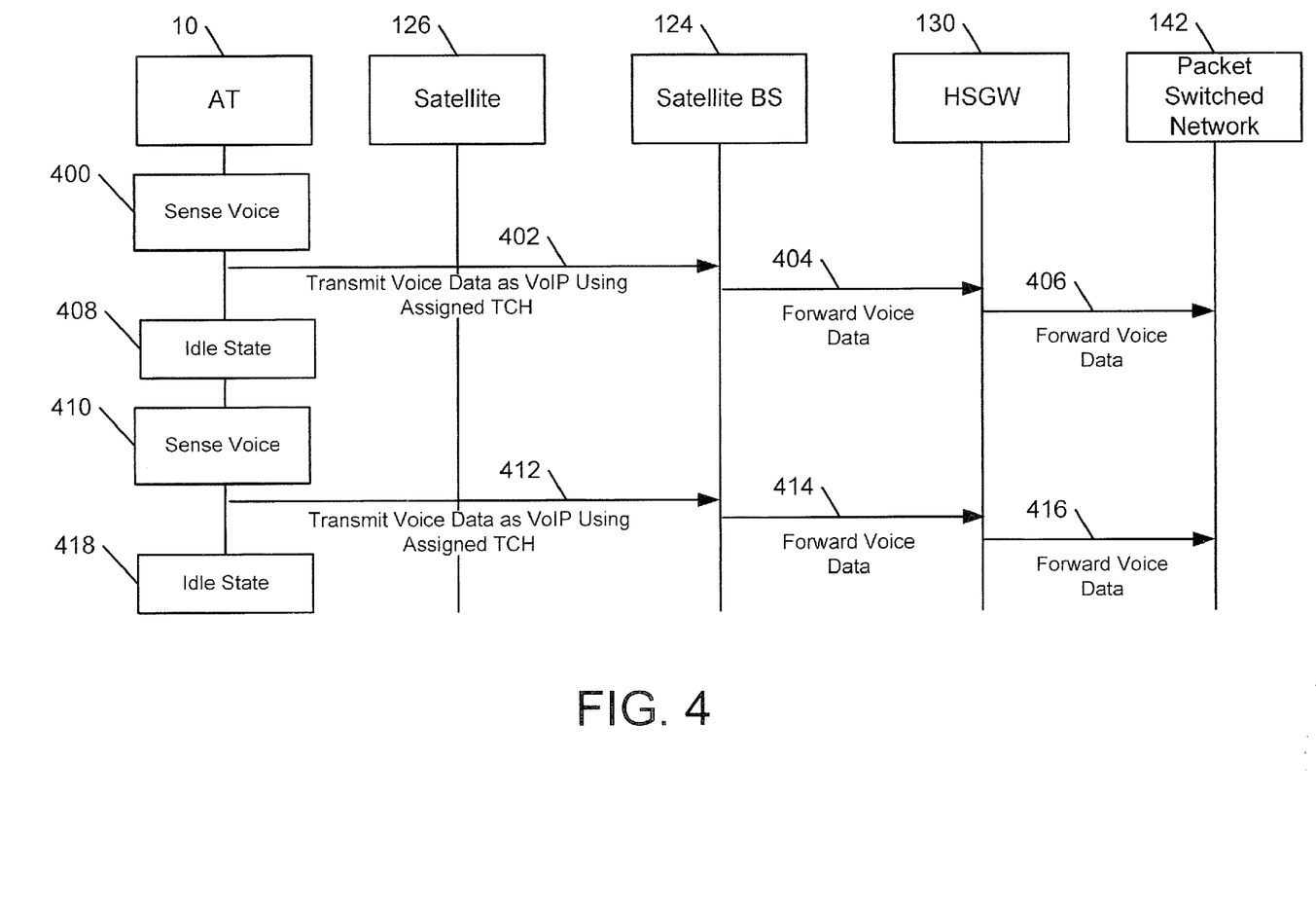
FIG. 4 is a message flow diagram that illustrates exemplary operations and methods for Voice Over Internet Protocol communication by the terminal of FIG. 2 in accordance with some further embodiments of the present invention.

FIG. 4 is a message flow diagram that illustrates exemplary operations and methods for VOIP data communication by the AT 10 of FIG. 2 in accordance with some further embodiments of the present invention. Referring to FIG. 4, the AT 10 transmits each of a sequence of VOIP data traffic (e.g., generated from voice that is sensed by a microphone of the AT 10) using the retained traffic channel without waiting for assignment of another traffic channel to the AT 10. More particularly, responsive to voice being sensed and converted into a VOIP data (block 400), the AT 10 transmits (402) the VOIP data to the satellite 126, for relay to the SBS 124, using the assigned traffic channel and without waiting for assignment of another traffic channel to the AT 10. The SBS 124 forwards (block 404) the VOIP data to the HSGW 130, which then forwards (block 406) the VOIP data to the packet switched network 142. The AT 10 then enters the idle state 408 in response to not having further VOIP data that is ready for transmission. While in the idle state, the SBS 124 retains the assigned traffic channel for exclusive use by the AT 10 (i.e., the assigned traffic channel is not reassigned for use by another AT). Again responsive to voice being sensed and converted into VOIP data (block 410), the AT 10 transmits (block 412) the VOIP data to the satellite 126, for relay to the SBS 124, using the assigned traffic channel and without waiting for assignment of another traffic channel to the AT 10. The SBS 124 forwards (block 414) the VOIP data to the HSGW 130, which then forwards (block 416) the VIIP data to the packet switched network 142. The AT 10 then returns (block 418) to the idle state in response to not having further VOIP data that is ready for transmission. While in the idle state the SBS 124 again retains the assigned traffic channel for exclusive use by the AT 10.

Accordingly, various embodiments of the present invention may reduce communication latency for terminals that communicate with a SBN. Traffic channels can be pre-assigned and more permanently retained for terminals so they may more quickly transmit data traffic as it is becomes ready for transmission. The pre-assignment and retention of traffic channels may be regulated in response to a TOS designation that is associated with terminals, and the TOS designation can be set to provide reduced latency communication for terminals that communicate using PTT protocol service, VOIP service, and/or another service. The TOS designations for individual terminals may be controlled by service providers as a way of offering a premium service to subscribers. The number of traffic channels within a spot beam that are pre-assigned and retained for use by registered terminals can be controlled so that a defined number of traffic channels remain available for assignment to terminals responsive to their traffic channel requests (e.g., Connection Request Messages).

The present invention was described above with reference to block diagrams and message flow diagrams illustrating methods and apparatus (systems) according to embodiments of the invention. It is understood that operations in the diagrams may be implemented by computer program instructions. These computer program instructions may be provided to a processor of a general purpose computer, special purpose computer, such as a digital signal processor, and/or other programmable data processing apparatus to produce a machine, such that the instructions, which execute via the processor of the computer and/or other programmable data processing apparatus, create means for implementing the functions/acts specified in the diagrams. These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the diagrams. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the figures.

In the figures and specification, there have been disclosed embodiments of the invention and, although specific terms are employed, they are used in a generic and descriptive sense only and not for purposes of limitation, the scope of the invention being set forth in the following claims.

What is claimed is:

1. A wireless communications method comprising:
    assigning a traffic channel for use by a terminal to transmit data traffic to a satellite for relay to a satellite base station; and
    retaining the traffic channel assignment for use by the terminal while the terminal is idle between data traffic transmissions to the satellite in response to a type of service designation that is associated with the terminal and indicates that the terminal is to be provided reduced latency push-to-talk (PTT) protocol service.

2. The method of claim 1:
    wherein assigning a traffic channel for use by the terminal to transmit data traffic to the satellite for relay to the satellite base station comprises operating the satellite base station to assign a traffic channel for use by the terminal; and
    wherein retaining the traffic channel assignment for use by the terminal while the terminal is idle between data traffic transmissions to the satellite comprises operating the satellite base station to retain the traffic channel assignment for use by the terminal while the terminal is idle between data traffic transmissions to the satellite responsive to receiving from a serving gateway data indicating that the type of service designation is associated with the terminal.

3. The method of claim 1, wherein retaining the traffic channel assignment for use by the terminal while the terminal is idle between data traffic transmissions to the satellite comprises:
    responding to each of a sequence of user activations of a push-to-talk (PTT) switch of the terminal by transmitting voice data traffic from the terminal through the retained traffic channel assignment without waiting for assignment of another traffic channel to the terminal.

4. The method of claim 1, wherein retaining the traffic channel assignment for use by the terminal while the terminal is idle between data traffic transmissions to the satellite comprises:
    responding to generation of each of a sequence of Voice-Over-Internet Protocol (VOIP) data traffic from voice that is sensed by a microphone of the terminal by transmitting the VOIP data traffic from the terminal through the retained traffic channel assignment without waiting for assignment of another traffic channel to the terminal.

5. The method of claim 1:

wherein assigning a traffic channel for use by the terminal to transmit data traffic to the satellite for relay to the satellite base station comprises assigning a carrier frequency of a Frequency Division Multiplex Access (FDMA) channel for use by the terminal to transmit data traffic to the satellite for relay to the satellite base station; and wherein retaining the traffic channel assignment for use by the terminal while the terminal is idle between data traffic transmissions to the satellite in response to a type of service designation that is associated with the terminal comprises retaining the assigned carrier frequency for exclusive use by the terminal while the terminal is idle between data traffic transmissions to the satellite.

6. The method of claim 1:

wherein assigning a traffic channel for use by the terminal to transmit data traffic to the satellite for relay to the satellite base station comprises assigning a timeslot of a Time Division Multiplex Access (TDMA) channel for use by the terminal to transmit data traffic to the satellite for relay to the satellite base station; and wherein retaining the traffic channel assignment for use by the terminal while the terminal is idle between data traffic transmissions to the satellite in response to a type of service designation that is associated with the terminal comprises retaining the assigned timeslot for exclusive use by the terminal while the terminal is idle between data traffic transmissions to the satellite.

7. The method of claim 1:

wherein assigning a traffic channel for use by the terminal to transmit data traffic to the satellite for relay to the satellite base station comprises assigning a spreading code of a Code Division Multiplex Access (CDMA) channel for use by the terminal to transmit data traffic to the satellite for relay to the satellite base station; and wherein retaining the traffic channel assignment for use by the terminal while the terminal is idle between data traffic transmissions to the satellite in response to a type of service designation that is associated with the terminal comprises retaining the assigned spreading code for exclusive use by the terminal while the terminal is idle between data traffic transmissions to the satellite.

8. The method of claim 1, wherein assigning a traffic channel for use by the terminal to transmit data traffic to the satellite for relay to the satellite base station comprises:

communicating a registration request from the satellite base station to a serving gateway, the registration request identifying the terminal; and operating the serving gateway to cause searching of a database of terminal identifiers and corresponding type of service designations responsive to the registration request to identify the type of service designation for the identified terminal, and to communicate the identified type of service designation to the satellite base station.

9. The method of claim 1, wherein assigning a traffic channel for use by the terminal to transmit data traffic to the satellite for relay to the satellite base station comprises:

operating the satellite base station and/or a serving gateway to identify a type of service designation for the terminal responsive to data that is included in a communication data packet which is received by the satellite base station and/or the serving gateway during registration of the terminal.

10. The method of claim 9, wherein operating the satellite base station and/or a serving gateway to identify the type of service designation for the terminal comprises:

operating the serving gateway to identify a type of service designation for the terminal responsive to data that is included in a data packet which is received by the serving gateway from an Authorization, Authentication, and Accounting (AAA) server during registration of the terminal.

11. The method of claim 9, wherein operating the satellite base station and/or a serving gateway to identify a type of service designation for the terminal responsive to data that is included in a communication data packet which is received by the satellite base station and/or a serving gateway during registration of the terminal comprises:

identifying a type of service designation for the terminal from data contained in a Differentiated Services Code Point (DSCP) header portion of the communication data packet.

12. The method of claim 11, wherein identifying a type of service designation for the terminal from data contained in a DSCP header portion of the communication data packet:

identifying a type of service designation for the terminal from a value contained in bit locations 6 and/or 7 of the DSCP header portion of the communication data packet.

13. The method of claim 1, further comprising:

releasing the assigned traffic channel for use by another terminal in response to determining that less than a threshold number of traffic channels are available for assignment to other terminals.

14. The method of claim 1, further comprising:

releasing the assigned traffic channel for use by another terminal in response to determining that a signal quality of a communication received by the satellite from the terminal and/or received by the terminal from the satellite is less than a threshold level.

15. The method of claim 1, further comprising:

releasing the assigned traffic channel for use by another terminal in response to determining that the terminal is moving at greater than a threshold velocity.

16. The method of claim 1, further comprising:

releasing the assigned traffic channel for use by another terminal in response to determining that the terminal has been assigned a defined priority level.

17. The method of claim 1, further comprising:

releasing the assigned traffic channel for use by another terminal in response to determining that the terminal is not located at one of a plurality of defined locations.

18. The method of claim 1, further comprising:

releasing the assigned traffic channel for use by another terminal in response to occurrence of a time of day and/or a day of week.

19. A wireless communication system comprising:

a satellite base station that is configured to assign a traffic channel for use by a terminal to transmit data traffic to a satellite for relay to the satellite base station, and to retain the traffic channel assignment for use by the terminal while the terminal is idle between data traffic transmissions to the satellite in response to a type of service designation that is associated with the terminal and indicates that the terminal is to be provided reduced latency push-to-talk (PTT) protocol service.

20. The system of claim 19, wherein:
the terminal is configured to respond to each of a sequence of user activations of a push-to-talk (PTT) switch of the terminal by transmitting voice data traffic through the retained traffic channel assignment without waiting for assignment of another traffic channel to the terminal by the satellite base station.

21. The system of claim 19, wherein:
the terminal is configured to respond to generation of each of a sequence of Voice-Over-Internet Protocol (VOIP) data traffic from voice that is sensed by a microphone of the terminal by transmitting the VOIP data traffic from the terminal through the retained traffic channel assignment without waiting for assignment of another traffic channel to the terminal by the satellite base station.

22. The system of claim 19, wherein:
the satellite base station is further configured to assign a carrier frequency of a Frequency Division Multiplex Access (FDMA) channel for use by the terminal to transmit data traffic to the satellite for relay to the satellite base station, and to retain the assigned carrier frequency for exclusive use by the terminal while the terminal is idle between data traffic transmissions to the satellite.

23. The system of claim 19, wherein:
the satellite base station is further configured to assign a timeslot of a Time Division Multiplex Access (TDMA channel for use by the terminal to transmit data traffic to the satellite for relay to the satellite base station, and to retain the assigned timeslot for exclusive use by the terminal while the terminal is idle between data traffic transmissions to the satellite.

24. The system of claim 19, wherein:
the satellite base station is further configured to assign a spreading code of a Code Division Multiplex Access (CDMA) channel for use by the terminal to transmit data traffic to the satellite for relay to the satellite base station, and to retain the assigned spreading code for exclusive use by the terminal while the terminal is idle between data traffic transmissions to the satellite.

25. The system of claim 19:
further comprising a serving gateway that is configured to receive a registration request message that was transmitted by the terminal to the satellite base station, to cause searching of a database of terminal identifiers and corresponding type of service designations responsive to the registration request message to identify the type of service designation for the identified terminal, and to communicate the identified type of service designation to the satellite base station,
wherein the satellite base station is configured to determine whether to assign and retain a traffic channel for use by the terminal responsive to the identified type of service designation.

26. The system of claim 25, further comprising:
an Authorization, Authentication, and Accounting (AAA) server that is configured to respond to the registration request message by searching the database to identify the type of service designation for the identified terminal, and to communicate the identified type of service designation in a Differentiated Services Code Point (DSCP) header portion of a data packet.

27. The system of claim 26, wherein:
the AAA server is further configured to communicate the identified type of service designation to the serving gateway through a value contained in bit locations 6 and/or 7 of the DSCP header portion of the data packet.

28. The system of claim 19, wherein:
the satellite base station is further configured to release the assigned traffic channel for use by another terminal in response to determining that less than a threshold number of traffic channels are available for assignment to other terminals.

29. The system of claim 19, wherein:
the satellite base station is further configured to release the assigned traffic channel for use by another terminal in response to determining that a signal quality of a communication received by the satellite from the terminal and/or received by the terminal from the satellite is less than a threshold level.

30. The system of claim 19, wherein:
the satellite base station is further configured to release the assigned traffic channel for use by another terminal in response to determining that the terminal is moving at greater than a threshold velocity.

31. The system of claim 19, wherein:
the satellite base station is further configured to release the assigned traffic channel for use by another terminal in response to determining that the terminal has been assigned a defined priority level.

32. The system of claim 19, wherein:
the satellite base station is further configured to release the assigned traffic channel for use by another terminal in response to determining that the terminal is not located at one of a plurality of defined locations.

33. The system of claim 19, wherein:
the satellite base station is further configured to release the assigned traffic channel for use by another terminal in response to occurrence of a time of day and/or a day of week.

34. A wireless communication system comprising:
a terminal that is configured to receive from a satellite base station a traffic channel assignment for use by the terminal to transmit data traffic to a satellite for relay to the satellite base station and a command that indicates whether the traffic channel assignment is to be retained while idle, and to retain the traffic channel assignment for use by the terminal while the terminal is idle between data traffic transmissions to the satellite in response to the command indicating that the assignment is to be retained while idle,
wherein the terminal is further configured to: 1) respond to each of a sequence of user activations of a push-to-talk (PTT) switch of the terminal by transmitting voice data traffic through the retained traffic channel assignment without waiting for assignment of another traffic channel to the terminal by the satellite base station; and/or 2) respond to generation of each of a sequence of Voice-Over-Internet Protocol (VOIP) data traffic from voice that is sensed by a microphone of the terminal by transmitting the VOIP data traffic from the terminal through the retained traffic channel assignment without waiting for assignment of another traffic channel to the terminal by the satellite base station.

35. The system of claim 34, wherein:
the terminal is further configured to receive from the satellite base station an assigned carrier frequency of a Frequency Division Multiplex Access (FDMA) channel for use by the terminal to transmit data traffic to the satellite for relay to the satellite base station, and to respond to data traffic becoming ready for transmission while the terminal is idle between data traffic transmissions to the satellite by transmitting the data traffic using the assigned carrier frequency without requesting assigning of another carrier frequency from the satellite base station.

36. The system of claim 34, wherein:

the terminal is further configured to receive from the satellite base station a timeslot of a Time Division Multiplex Access (TDMA) channel for use by the terminal to transmit data traffic to the satellite for relay to the satellite base station, and to respond to data traffic becoming ready for transmission while the terminal is idle between data traffic transmissions to the satellite by transmitting the data traffic using the assigned timeslot without requesting assigning of another timeslot from the satellite base station.

37. The system of claim 34, wherein:

the terminal is further configured to receive from the satellite base station a spreading code of a Code Division Multiplex Access (CDMA) channel for use by the terminal to transmit data traffic to the satellite for relay to the satellite base station, and to respond to data traffic becoming ready for transmission while the terminal is idle between data traffic transmissions to the satellite by transmitting the data traffic using the assigned spreading code without requesting assigning of another spreading code from the satellite base station.

\* \* \* \* \*